(12) United States Patent
Parker et al.

(10) Patent No.: US 8,667,125 B2
(45) Date of Patent: Mar. 4, 2014

(54) MONITORING USER ACTIVITY ON A MOBILE DEVICE

(75) Inventors: Myles Parker, Monument, CO (US); Caroline Dinan Horner, Darien, CT (US); Benjamin Gerard Husser, Conyers, GA (US); John Yakemovic, Atlanta, GA (US); Jeffrey Meyers, Lilburn, GA (US)

(73) Assignee: Dish Network L.L.C., Englewood, CO (US)

( * ) Notice: Subject to any disclaimer, the term of this patent is extended or adjusted under 35 U.S.C. 154(b) by 112 days.

(21) Appl. No.: 12/823,116

(22) Filed: Jun. 24, 2010

(65) Prior Publication Data

US 2011/0320583 A1  Dec. 29, 2011

(51) Int. Cl.
*G06F 15/16* (2006.01)

(52) U.S. Cl.
USPC ............... 709/224; 709/219; 725/32; 725/36; 725/40; 725/60; 725/62; 715/719

(58) Field of Classification Search
USPC .................................. 709/224, 221, 227, 245
See application file for complete search history.

(56) References Cited

U.S. PATENT DOCUMENTS

| | | | | |
|---|---|---|---|---|
| 5,870,149 A * | 2/1999 | Comroe et al. | ................ | 348/474 |
| 7,251,500 B2 * | 7/2007 | Nakagawa et al. | ........ | 455/556.1 |
| 7,496,281 B2 * | 2/2009 | Ishida | ........................... | 386/291 |
| 7,567,207 B2 * | 7/2009 | Angus | ...................... | 342/357.72 |
| 7,606,799 B2 * | 10/2009 | Kalinichenko et al. | ............... | 1/1 |
| 7,698,393 B2 * | 4/2010 | Milstein et al. | ............... | 709/221 |
| 8,055,221 B2 * | 11/2011 | Lee et al. | .................... | 455/180.1 |
| 8,307,392 B2 * | 11/2012 | Ahanger et al. | ................ | 725/36 |
| 8,316,392 B2 * | 11/2012 | Ahanger et al. | ................ | 725/32 |
| 8,320,939 B1 | 11/2012 | Vincent | | |
| 8,348,762 B2 * | 1/2013 | Willis | ............................. | 463/42 |
| 2002/0059632 A1 | 5/2002 | Link et al. | | |
| 2002/0092019 A1 | 7/2002 | Marcus | | |
| 2002/0133393 A1 | 9/2002 | Tatsumi | | |
| 2005/0204379 A1 | 9/2005 | Yamamori | | |
| 2006/0084410 A1 * | 4/2006 | Sutaria et al. | ................. | 455/408 |
| 2006/0222328 A1 * | 10/2006 | Akahane | ......................... | 386/83 |
| 2008/0201731 A1 | 8/2008 | Howcroft | | |
| 2010/0057466 A1 * | 3/2010 | Garg et al. | .................... | 704/260 |

FOREIGN PATENT DOCUMENTS

TW       201215109 A    4/2012
WO    2011/163019 A1   12/2011

OTHER PUBLICATIONS

International Search Report of PCT/US2011/040407 mailed on Jul. 1, 2011, 4 pages.

* cited by examiner

*Primary Examiner* — Jude Jean Gilles
(74) *Attorney, Agent, or Firm* — Kilpatrick Townsend & Stockton LLP

(57) ABSTRACT

Monitoring user activity on a mobile device is described. In one aspect, video content is received and played to a user of the mobile device. The monitoring activity detects an interruption of playback of the video content and determines an event associated with the interruption. The event is stored in the mobile device and communicated to a remote device.

22 Claims, 11 Drawing Sheets

Playback of Recorded Content

Table columns: Event Type | Service ID | Time of Recording | Time of Playback Start | Trick Play Event | Time | Trick Play Date/TM | Playback End Date/TM | SNR | RS Error | GPS Position Transition Between Video and Other Modes Table columns: Event Type | Date and Time | Audio Mode | Screen Size Mode | Controls | SNR | RS Error

| EVENT TYPE | STATE | SNR | RS ERROR | GPS POSITION |
|---|---|---|---|---|

⎫ POWER STATE CHANGES

Fig. 12

| EVENT TYPE | START TIME | END TIME | DISPLAY COVER | ID | SNR | RS ERROR | GPS POSITION |
|---|---|---|---|---|---|---|---|

⎫ TRACKING OF DISPLAY CHARACTERISTICS

Fig. 13

MONITORING USER ACTIVITY ON A MOBILE DEVICE

BACKGROUND

The rapid increase in mobile device usage as well as the increase in functionality offered by mobile devices has created a variety of new applications for these devices. Mobile device users are now relying on mobile devices for more than telephone conversation and communicating via text messages. Current mobile devices have sufficient computing resources to perform a variety of tasks, such as displaying video content stored on the mobile device or streamed to the device through a wireless communication link.

As the number and types of tasks performed on mobile devices increase, mobile service providers and other organizations seek to provide valuable content and services to the mobile device users. To identify user interests and preferences regarding content, such as video content, it is desirable to monitor user activity on the mobile device. For example, organizations providing video content to mobile devices benefit from knowing the types of content and viewing habits of mobile device users. Therefore, it is desirable to offer a system for monitoring user activity with respect to various types of content to provide an improved user experience.

SUMMARY

The described systems and methods relate to monitoring and reporting user activity associated with a mobile device. In a specific implementation, the mobile device receives video content from a data source and displays that video content to a user of the mobile device. The mobile device detects an interruption of playback of the video content and determines an event associated with that interruption. Information related to the event is stored in the mobile device and communicated to a remote device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

FIG. 12 shows exemplary data associated with a power state change event, according to one embodiment.

FIG. 13 shows exemplary data associated with tracking of display characteristics, according to one embodiment.

DETAILED DESCRIPTION

Overview

The systems and methods described herein relate to the monitoring and reporting usage of a mobile device. These systems and methods monitor user habits when viewing video content on the mobile device. In particular, when the viewing of video content is interrupted, a log file is updated indicating the reason for stopping the video playback. These reasons include, for example, user selection of different video content, activating a different application on the mobile device, loss of power, loss of a communication link to the video data source, and the like. The information collected in the log file is communicated to a server or similar device for analysis of user viewing habits and related information.

As used herein, a mobile device may include a cellular phone, smart phone, handheld computer, tablet computer, laptop computer, portable gaming device, portable entertainment device, or other portable device capable of performing some or all of the functions discussed herein. As further used herein, a mobile device may also be referred to as a "portable computing device". Although particular examples discussed herein relate to the display of video content on a mobile device, the present invention is applicable to the handling of any type of content or other data received by the mobile device.

An Exemplary System for Monitoring Usage of a Mobile Device

Figure 1:
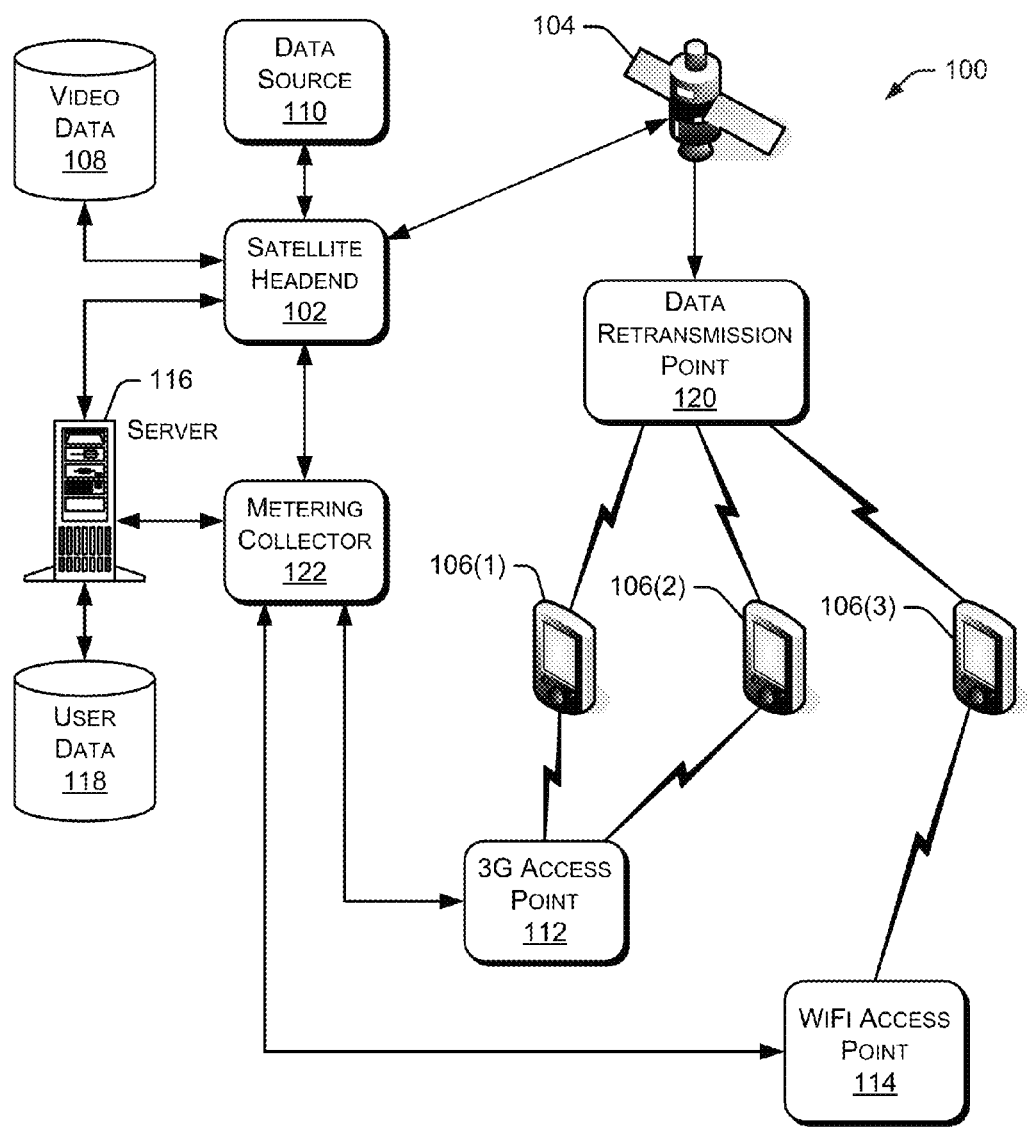
FIG. 1 shows an exemplary environment capable of implementing the systems and methods described herein.

FIG. 1 shows an exemplary environment 100 capable of implementing the systems and methods described herein. A satellite headend 102 communicates various types of data to a satellite 104. As discussed herein, satellite headend 102 communicates video content (e.g., movies, television programs, sporting events and music videos) to one or more data retransmission points 120. Data retransmission point 120 is capable of communicating with satellite 104 as well as multiple mobile devices 106. Satellite headend 102 may also communicate the same video content to other devices (not shown) simultaneously via satellite 104. Additionally, satellite headend 102 may communicate video content to mobile devices 106 through other communication paths, such as via other access points of the type discussed below.

Satellite headend 102 receives various types of content from multiple sources. In the example of FIG. 1, satellite headend 102 receives video content from a video data store 108 and receives additional data from a data source 110. Data source 110 may provide video content, audio content, or any other type of data to satellite headend 102. Data source 110 can be located proximate satellite headend 102 or at a distant geographic location.

Mobile device 106 receives video content and other data from data retransmission point 120. In a particular embodiment, data retransmission point 120 communicates with mobile device 106 via a wireless communication link at approximately 700 MHz. Data retransmission point 120 is located proximate a transmission tower or other transmission system capable of transmitting data to multiple mobile devices 106. Data retransmission point 120 also includes a satellite receiver capable of receiving video content and other data from one or more satellites 104.

In a particular embodiment, mobile device 106 includes an application program that is capable of rendering and displaying the received video content on the mobile device's display screen. This application allows the user of mobile device 106 to watch television programs, movies, and similar content on the mobile device. In a particular implementation, the user selects among multiple video content programs based on the video content available for communication to mobile device 106 through satellite 104 and data retransmission point 120.

In a particular embodiment, mobile device 106 communicates back to satellite headend 102 via a metering collector 122. Metering collector 122 receives data from multiple mobile devices 106 and forwards that data to satellite headend 102 and/or a server 116. Additionally, metering collector 122 may store data received from one or more mobile devices 106. Mobile device 106 communicates with metering collector 122 via a data communication network (or "back channel") such as 3G (3rd generation) or WiFi (a wireless networking technology). 3G defines a family of standards for mobile communications. WiFi is defined as a wireless local area network (WLAN) based on IEEE (Institute of Electrical and Electronics Engineers) 802.11 standards. This channel is used to communicate user commands and other information from mobile device 106 to metering collector 122. In this embodiment, mobile devices 106(1) and 106(2) utilize the 3G data communication network, which is accessed via a 3G access point 112. Mobile device 106(3) uses a WiFi data communication network, and accesses that network via a WiFi access point 114. WiFi access point 114 and 3G access point 112 are coupled to metering collector 122 via one or more data communication networks, such as local area networks (LANs), wide area networks (WANs) and the Internet. Similarly, metering collector 122 is coupled to satellite headend 102 and server 116 via one or more data communication networks or other communication links.

In addition to the communication of data from mobile device 106 to metering collector 122 via access points 112 and 114, the metering collector may use this same communication path to communicate video content and other data to the mobile device.

Mobile devices 106 communicate various user viewing habits and activities to metering collector 122. As shown in FIG. 1, server 116 is coupled to satellite headend 102 and metering collector 122 such that server 116 receives user viewing information from mobile devices 106 via the satellite headend and/or the metering collector. In alternate embodiments, server 116 receives user viewing information directly from the mobile devices 106 (e.g., via a 3G or WiFi communication link). Server 116 stores the user viewing information received from mobile devices 106 in a user data store 118, such as a database. Server 116 represents any type of computing device capable of receiving and storing data as discussed herein. In one embodiment, server 116 is located proximate satellite headend 102 or metering collector 122. In alternate embodiments, server 116 is positioned a significant distance from both satellite headend 102 and metering collector 122, and is configured to communicate with the satellite headend or metering collector via one or more data communication networks.

Although the described environment 100 distributes video content to mobile devices 106 via satellite, alternate embodiments may distribute video content via any communication mechanism. For example, video content and other data can be communicated to data retransmission point 120 via a wired or wireless communication link with a data communication network, such as the Internet. In particular embodiments, data retransmission point 120 receives video content and other data from multiple sources, such as satellite 104 as well as a wired or wireless communication link to a data communication network.

Figure 2:
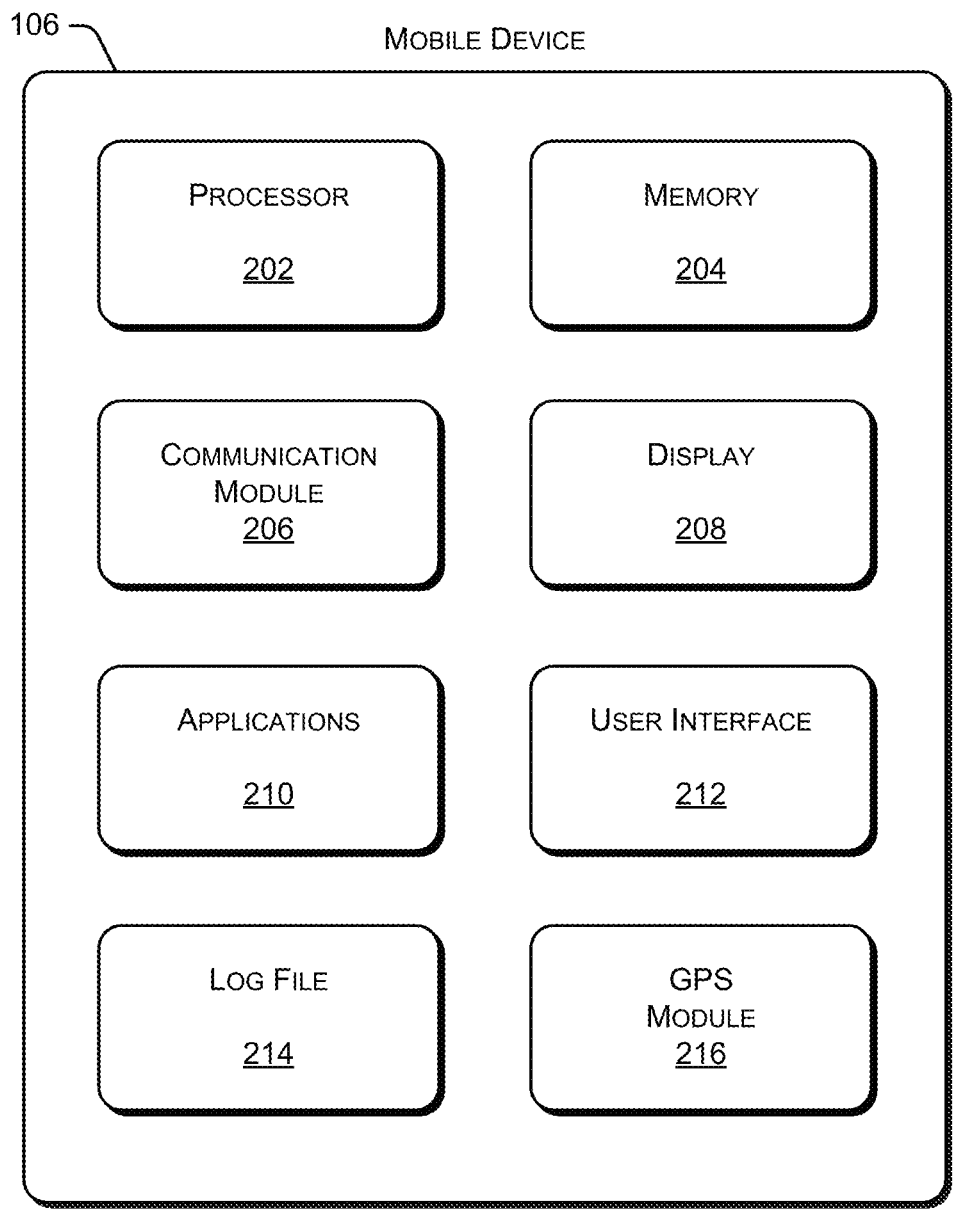
FIG. 2 is a block diagram showing various components of an exemplary mobile device, according to one embodiment.

FIG. 2 is a block diagram showing various components of exemplary mobile device 106, according to one embodiment. Mobile device 106 includes a processor 202, a memory 204 and a communication module 206. Processor 202 executes various instructions to implement the functionality discussed herein. Memory 204 stores these instructions as well as other data used by processor 202 and other modules contained in mobile device 106. Communication module 206 allows mobile device 106 to communicate with other devices and systems, such as data retransmission point 120, 3G access point 112 and WiFi access point 114 shown in FIG. 1.

Mobile device 106 also includes a display 208 and a user interface 212. Display 208 is used to present video content and other information to a user of the mobile device. In a particular embodiment, display 208 is a touch-sensitive display such that the display can also function to receive user input. User interface 212 receives information from the user (e.g., via touch-sensitive display 208 and various buttons, switches, and other input controls) and presents options and other information to the user via the display. User interface 212 allows the user to control the operation of mobile device 106, including the execution of various applications and other functions contained in the mobile device.

Applications 210 in mobile device 106 perform various operations using other components of the mobile device. Example applications 210 include a video content player, a telephone application, a web browser application, a mobile device configuration application, and the like. A log file 214 stores information related to user viewing habits, user activities, signal strength and GPS location data associated with mobile device 106. Additional details regarding the use of log file 214 are provided herein. A GPS (Global Positioning System) module 216 identifies location coordinates associated with the current position of mobile device 106. These location coordinates are stored in log file 214 along with other data associated with mobile device 106. In alternate embodiments, module 216 uses other location identification procedures to determine the location of mobile device 106, such as cell tower triangulation or WiFi positioning.

An Exemplary Procedure for Monitoring Usage of a Mobile Device

Figure 3:
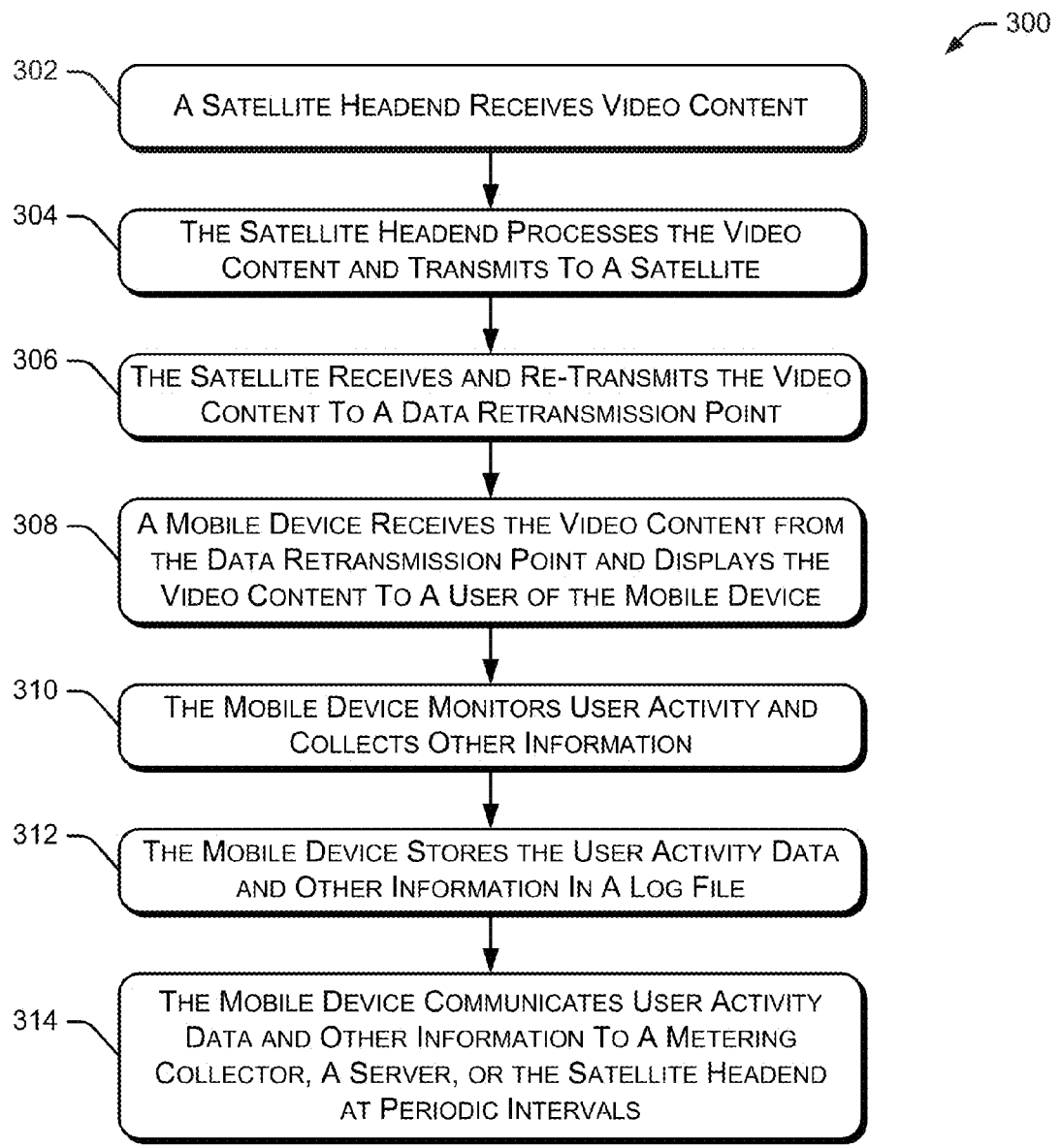
FIG. 3 shows an exemplary procedure for monitoring usage of a mobile device, according to one embodiment.

FIG. 3 shows an exemplary procedure 300 for monitoring usage of a mobile device, according to one embodiment. Initially, a satellite headend receives video content (block 302). As discussed above, the satellite headend can receive video content from a variety of sources, such as data source 110 and stored video data 108. The satellite headend processes the video content and transmits the processed video content to a satellite (block 304), such as satellite 104 shown in FIG. 1. This processing may include compressing the video data prior to communication or reformatting the video content for proper display on different display screen sizes, resolution and aspect ratio. Procedure 300 continues as the satellite receives the video content from the head end and re-transmits the video content to a data retransmission point (block 306), such as data retransmission point 120 shown in FIG. 1.

A mobile device (such as mobile device 106 shown in FIG. 1) receives the video content from the data retransmission point and displays the video content to a user of the mobile device (block 308). In a particular embodiment, playback of the video content displayed to the user of the mobile device is under the control of the user. The user is able to navigate to different parts of the video content, pause playback, and terminate playback of the video content. The mobile device monitors user activity and collects other information (block 310), such as GPS location information, signal strength and so forth. Additionally, the mobile device monitors user activity and device activity for any interruption in the display or playback of the video content. This interruption may be the result of a variety of factors, such as the user stopping playback, changing video channels, or launching a different application. Further, the interruption may be the result of a loss of communication with the data retransmission point, mobile device battery failure, and so forth.

The mobile device stores the user activity data and other information in a log file (block 312) within the mobile device. Finally, the mobile device communicates the user activity data and other information from the log file to a metering collector, a server, or the satellite headend at periodic intervals (block 314). In one embodiment, log file data is communicated to the headend at regular intervals, such as every five seconds. In other embodiments, log file data is communicated to the headend based on the amount of data stored in the log file (e.g., when the log file has a certain number of data entries or when the log file is 50% full).

In an alternate embodiment, a first communication device receives the video content from the data retransmission point, as discussed above with respect to FIG. 3. The first communication device does not play the received video content. Instead, the first communication device communicates the received video content to a mobile device, which plays the received video content. The first communication device monitors user activity on the mobile device, as reported back to the first communication device by the mobile device. The first communication device stores the user activity data and other information in a log file and communicates that data and information to a metering collector, a server, or a satellite headend at periodic intervals.

Figure 4:
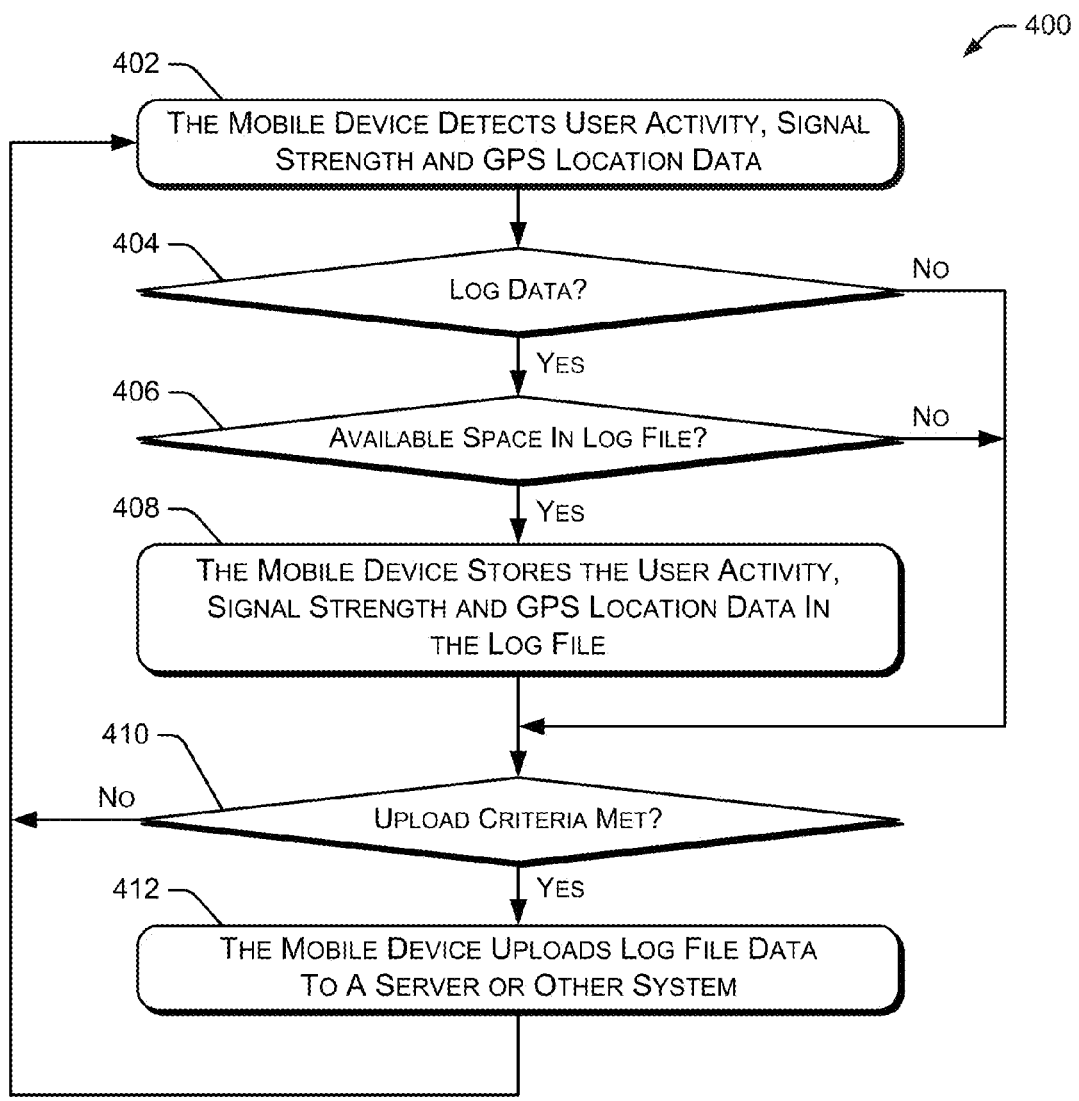
FIG. 4 shows an exemplary procedure for logging and uploading mobile device usage information, according to one embodiment.

FIG. 4 shows an exemplary procedure 400 for logging and uploading mobile device usage information, according to one embodiment. Initially, the mobile device detects user activity, signal strength and GPS location data (block 402). The various information collected regarding user activity, signal strength and GPS location is stored in the log file at periodic intervals, such as every five seconds. Procedure 400 continues by determining whether the current time is appropriate for storing data to the log file (block 404). If not, the procedure branches to block 410 to determine whether upload criteria has been met, as discussed below.

If block 404 indicates that data is to be logged, the procedure next determines whether storage space exists in the log file for the new data (block 406). If there is insufficient space in the log file, the procedure branches to block 410 without storing the data in the log file. If there is space in the log file to store the data, the mobile device stores the user activity, signal strength and GPS location data in the log file (block 408). The procedure continues to block 410, which determines whether criteria is met for uploading the log file data to a server or other device (block 412). In a particular embodiment, this upload criteria includes uploading the log file data when 1) the total number of files stored on the mobile device exceeds 50% of the maximum allowed files; or 2) the last upload of log file data occurred more than one week ago. If the upload criteria is not met at block 410, the procedure returns to block 402, where the mobile device continues detecting user activity, signal strength and GPS location data.

If the upload criteria is met, the mobile device uploads the log file data to a server or other device/system (block 412). For example, the mobile device may upload the log file data directly to server 116 (FIG. 1), upload the log file data to the server through metering collector 122, or upload the log file data to the server via satellite headend 102. Server 116 stores the log file data in user data store 118. In a particular embodiment, the log file data is communicated using the HTTPS (Hypertext Transfer Protocol Secure) protocol and utilizes the standard POST mechanism to submit the log file data to the identified server.

In alternate embodiments, the mobile device uploads the log file data to any remote device capable of storing the log file data. This remote device may be a server (as discussed herein) or any other computing device capable of communicating with the mobile device and receiving the log file data. The remote device may store the log file data itself or communicate the data to another device that stores the log file data for future reference or analysis.

Figure 5:
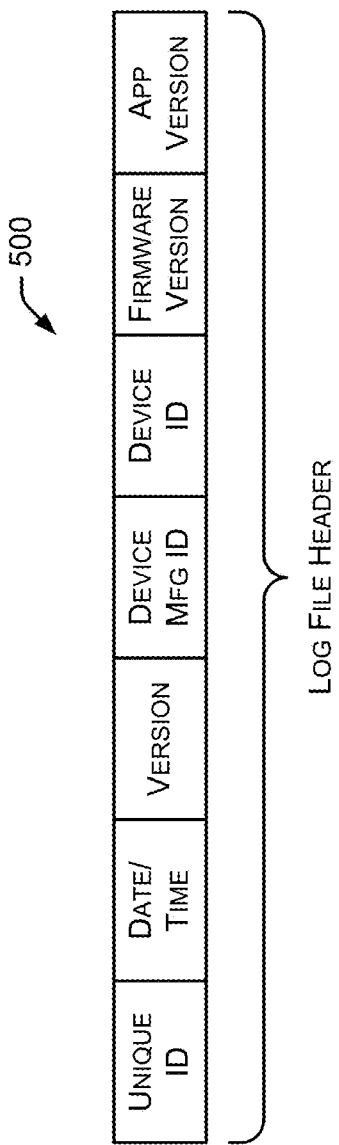
FIG. 5 shows an exemplary log file header, according to one embodiment.

FIG. 5 shows an exemplary log file header 500, according to one embodiment. Log file header 500 includes a unique identifier assigned to each log file. In a particular implementation, the unique identifier is an integer number. Log file header 500 also contains an indicator of the date and time the log file was created, and a version associated with the reporting structure. The version is particularly useful when different log file versions are used over a period of time. Log file header 500 also includes a device manufacture identifier and a device identifier. The device manufacture identifier indicates the manufacturer or vendor of the mobile device, and the device identifier is a unique identifier associated with the particular mobile device. Log file header 500 further contains a firmware version and an application version. The firmware version indicates the version of firmware installed in the particular mobile device, and the application version indicates the version of the video player application executing on the mobile device.

Figure 6:
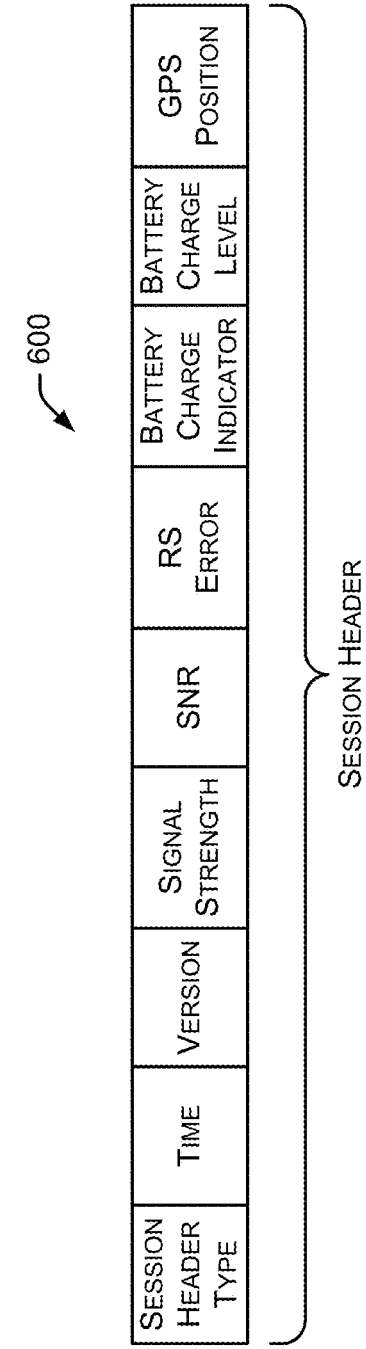
FIG. 6 shows an exemplary session header, according to one embodiment.

FIG. 6 shows an exemplary session header 600, according to one embodiment. Each logging session has a session header at the beginning and ending of the logging session. Session header 600 includes a session header type, a time and a version. The session header type indicates whether session header 600 is associated with the start of a logging session or with the end of a logging session. The time parameter in session header 600 indicates the time when the session header was created. The version indicates a software version associated with the application that monitors user activity and other data.

Session header 600 also includes a signal strength, a signal-to-noise ratio (SNR) and an RS error. The signal strength is associated with the strength of the communication link between the mobile device and a satellite communicating video content to the mobile device. The SNR is also associated with the communication link between the mobile device and the satellite. The RS error refers to the Reed-Solomon error, which includes codes used to correct various symbol errors.

Session header 600 further includes a battery charge indicator, a battery charge level and a GPS location. The battery charge indicator is set depending on whether the battery in the mobile device is currently charging. The battery charge level indicates the percentage of battery life remaining. The GPS location identifies the current geographic location of the mobile device.

Figure 7:
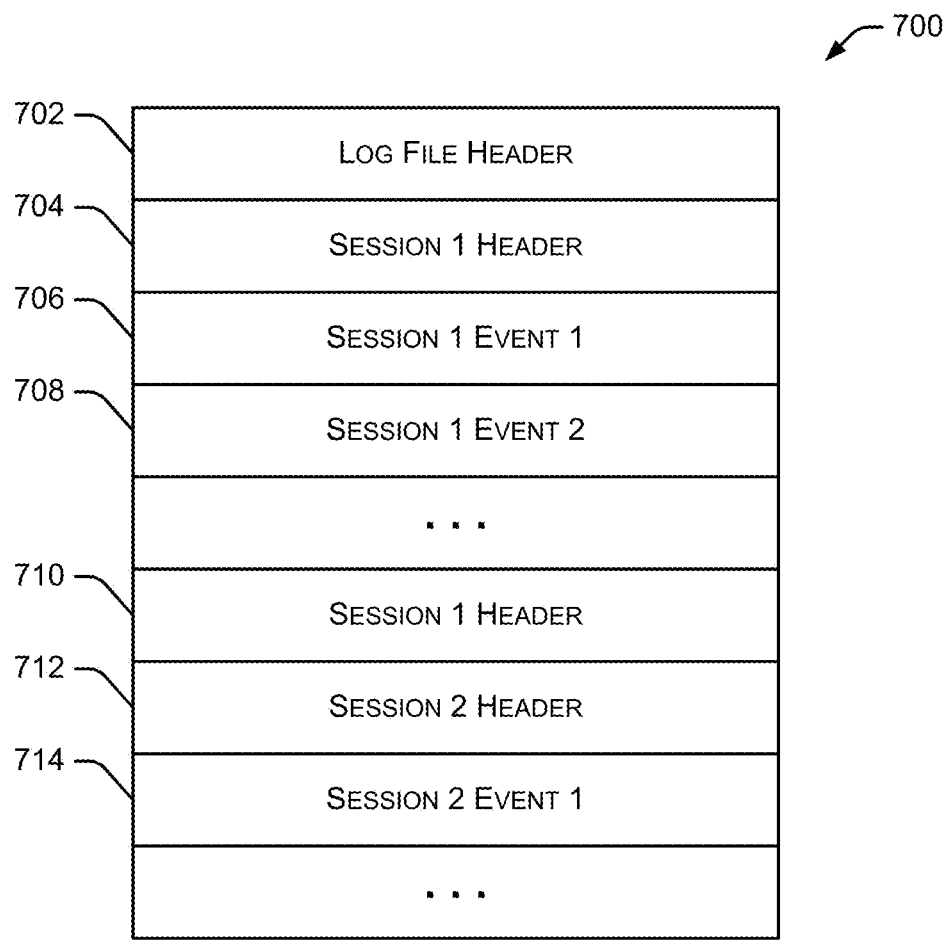
FIG. 7 shows an exemplary log file, according to one embodiment.

FIG. 7 shows an exemplary log file 700, according to one embodiment. FIG. 7 illustrates a portion of log file 700 associated with two different sessions (labeled "Session 1" and "Session 2). Log file 700 includes a log file header 702 containing the information discussed above with respect to FIG. 5. A session 1 header 704 indicates the start of Session 1, and is followed by multiple events that occur during that session (i.e., "Event 1" and "Event 2" identified by reference numerals 706 and 708, respectively). A particular session may include any number of events. Another session 1 header 710 indicates the end of Session 1. A session 2 header 712 indicates the start of Session 2, and is followed by session 2 event 1 (reference numeral 714) and additional events that occur in session 2. This same data structure is followed for the remaining sessions stored in log file 700.

Figure 8:
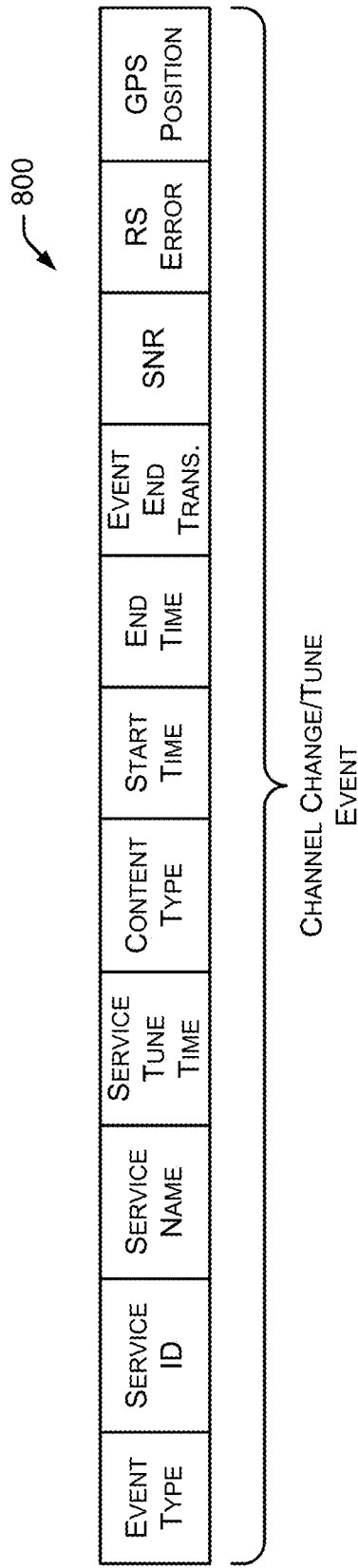
FIG. 8 shows exemplary event data associated with a channel change or tune event, according to one embodiment.

FIG. 8 shows exemplary event data 800 associated with a channel change or channel tuning event, according to one embodiment. This event occurs when a user of the mobile device changes to a different television channel or other content channel, thereby indicating that the user is no longer watching the previous video content. This event information is collected to determine how long the user viewed the previous video content and what video content they selected as a result of the channel change.

Event data 800 includes an event type that indicates a channel change, a service ID associated with the service being used by the mobile device, and a service name related to the name of the channel the user is viewing. Event data 800 also includes a service tune time indicating the time required to begin displaying video content to the user, and a content type indicating whether the video content is broadcast streaming, broadcast file delivery, or some other type of content. Event data 800 further includes a start time and an end time associated with the video content, and an event end transition that indicates the reason for the channel change event. The reason for the channel change event may be a user channel change command, a change in power state (mobile device powered off or switched to standby mode), the user activated a different application on the mobile device (such as a phone application), loss of communication signal by the mobile device, or a user command to stop or exit the video display application. The reason for the channel change event is valuable in analyzing user viewing habits for various types of video content in different situations. Event data 800 also includes SNR data, RS error data and GPS position information, as discussed above with respect to FIG. 6.

Figure 9:
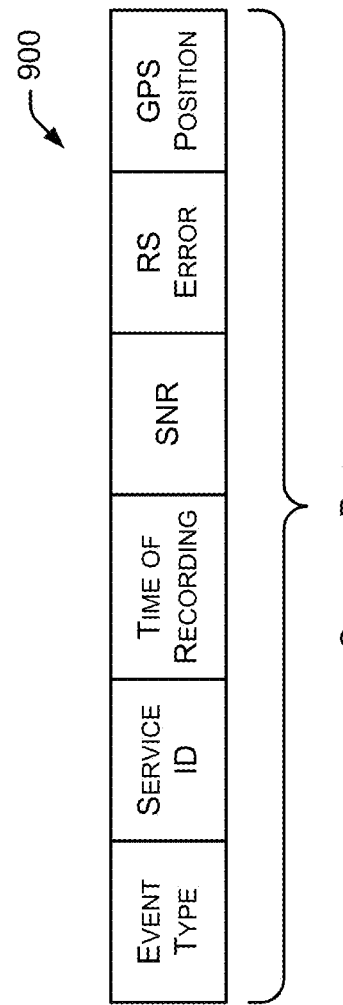
FIG. 9 shows exemplary data associated with a content recording event, according to one embodiment.

FIG. 9 shows exemplary event data 900 associated with a content recording event, according to one embodiment. Event data 900 includes an event type identifying the event as a content recording event and a service ID similar to the service ID shown in FIG. 8. Event data 900 also includes a time of recording field indicating the recording start time for the recording event. Additionally, event data 900 includes SNR, RS error and GPS position information of the type discussed herein.

Figure 10:
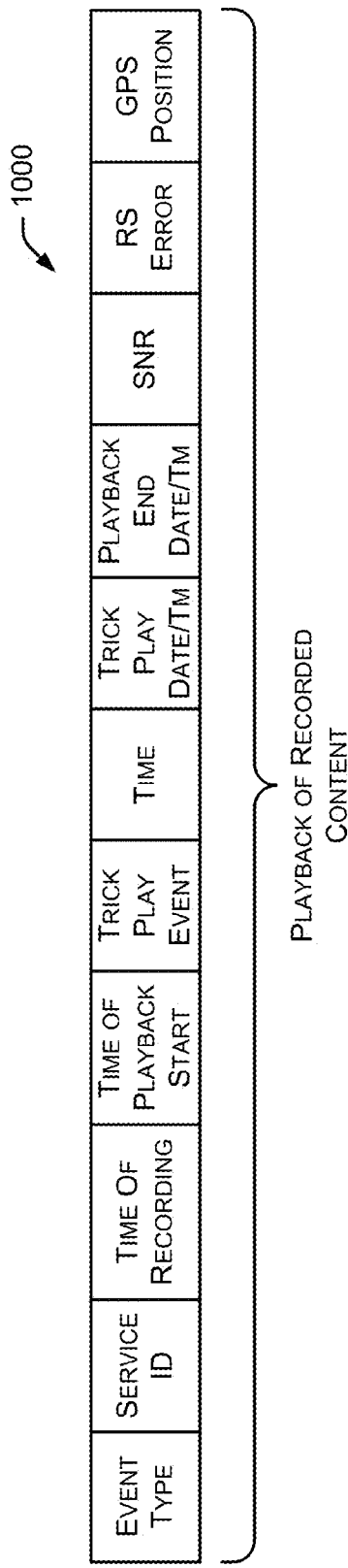
FIG. 10 shows exemplary data associated with a playback of recorded content event, according to one embodiment.

FIG. 10 shows exemplary event data 1000 associated with a playback of recorded content event, according to one embodiment. Event data 1000 includes an event type identifying the event as a recorded content playback event and a service ID similar to the service ID discussed above. Event data 1000 also includes a time of recording field indicating the start time for the recorded content, and a time of playback start indicating the time at which the user initiated the playback event. A trick play event indicator identifies whether the user has activated any "trick play events", such as pause, instant replay, or rewind during playback of the content.

Event data 1000 further includes a time field that indicates a time-based position within the content in relation to real-time viewing of the content. Trick play date/time data indicates the time that the trick play command occurred, and a playback end date/time identifies the end of the playback event. Additionally, event data 1000 includes SNR, RS error and GPS position information of the type discussed herein.

Figure 11:
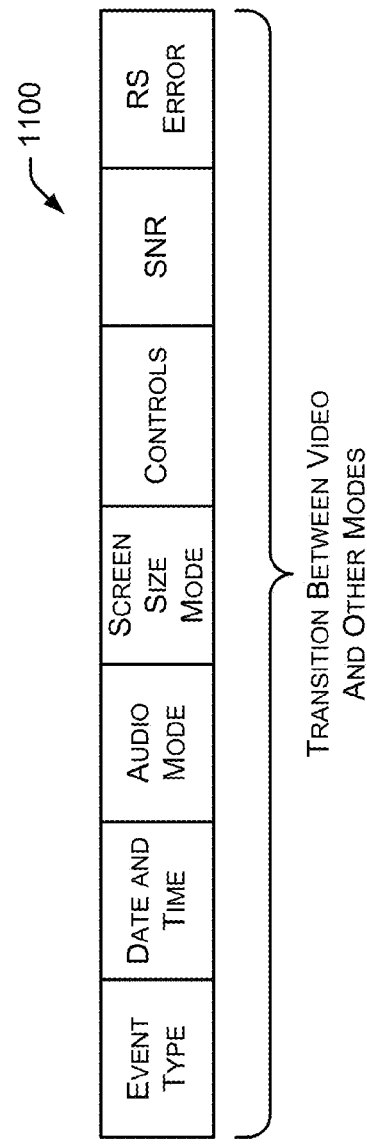
FIG. 11 shows exemplary data associated with a transition event from video playback to another mode of operation, according to one embodiment.

FIG. 11 shows exemplary event data 1100 associated with a transition event from video playback to another mode of operation, according to one embodiment. Event data 1100 includes an event type identifying the event as a transition away from the video playback mode. A date and time field indicates the time at which the transition occurred, and audio mode data indicates the audio mode of the mobile device, such as mobile device speakers are on, headphones are installed in the mobile device, or the device audio is muted. Event data 1100 also includes a screen size mode that indicates whether the mobile device is operating in full screen mode or some other display mode. A controls field indicates whether any available controls have been implemented, such as parental controls or other restrictions on operation of the mobile device. Additionally, event data 1100 includes SNR and RS error information of the type discussed herein.

FIG. 12 shows exemplary event data 1200 associated with a power state change event, according to one embodiment. Event data 1200 includes an event type identifying the event as a change in the power state of the mobile device, such as powering off the mobile device or changing the power state to standby. Event data 1200 also includes state information that indicates the current state of the mobile device. These states include powered on and connected to a wireless data network, powered off, operating on battery and operating on external power. Additionally, event data 1200 includes SNR, RS error and GPS position information of the type discussed herein.

FIG. 13 shows exemplary event data 1300 associated with tracking of display characteristics, according to one embodiment. Event data 1300 includes an event type identifying the event as tracking one or more display characteristics of the mobile device. Start time and end time data is associated with the time period of tracking the display characteristics. Event data 1300 includes a display cover that indicates what item is being displayed on the mobile device, such as an electronic program guide or a device menu. An ID field in event data 1300 is associated with menu commands and display windows, such as a channel list, program list on a particular channel, specific program information, settings menu, channel menu, or channel scan. Additionally, event data 1300 includes SNR, RS error and GPS position information of the type discussed herein.

Figure 14:
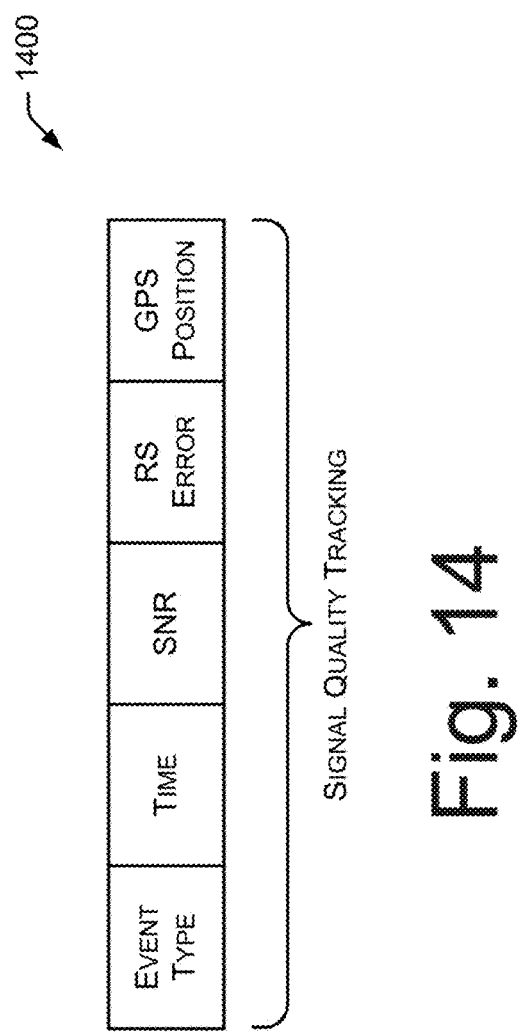
FIG. 14 shows exemplary data associated with tracking of signal quality, according to one embodiment.

FIG. 14 shows exemplary event data 1400 associated with tracking of signal quality, according to one embodiment. Event data 1400 includes an event type identifying the event as tracking signal quality associated with the communication link used by the mobile device. A time field indicates the time at which the signal quality event occurred. Event data 1400 also includes SNR, RS error and GPS position information of the type discussed herein. In a particular implementation, the signal quality tracking event is logged to the log file every five seconds.

Figure 15:
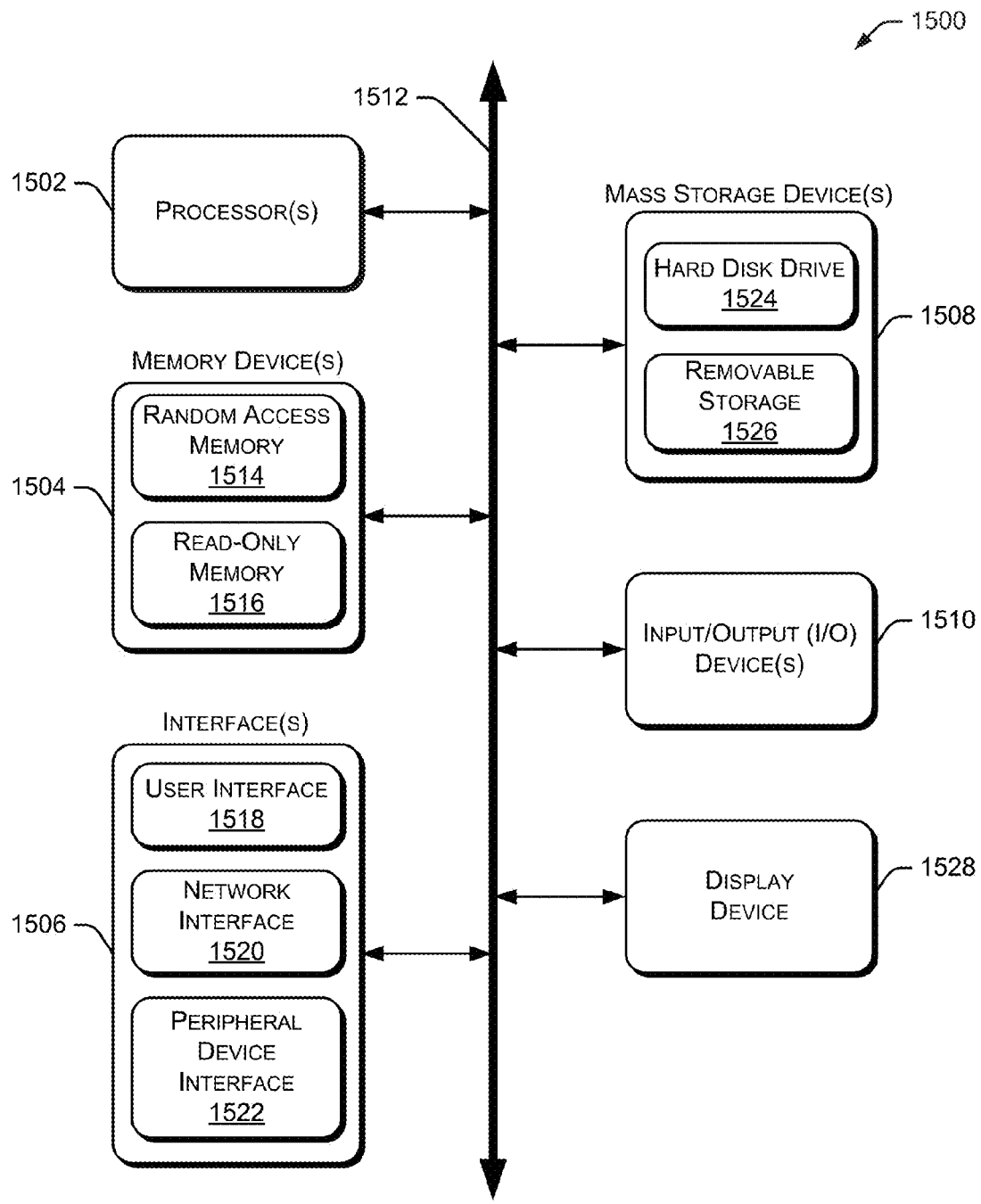
FIG. 15 is a block diagram showing an exemplary computing device, according to one embodiment.

FIG. 15 is a block diagram showing an exemplary computing device 1500, according to one embodiment. Computing device 1500 may be used to perform various procedures, such as those discussed herein. Computing device 1500 can function as a server, a client, a worker node, or any other computing entity. Computing device 1500 can be any of a wide variety of computing devices, such as a desktop computer, a notebook computer, a server computer, a handheld computer, and the like.

Computing device 1500 includes one or more processor(s) 1502, one or more memory device(s) 1504, one or more interface(s) 1506, one or more mass storage device(s) 1508, one or more Input/Output (I/O) device(s) 1510, and a display device 1528 all of which are coupled to a bus 1512. Processor(s) 1502 include one or more processors or controllers that execute instructions stored in memory device(s) 1504 and/or mass storage device(s) 1508. Processor(s) 1502 may also include various types of computer-readable media, such as cache memory.

Memory device(s) 1504 include various computer-readable media, such as volatile memory (e.g., random access memory (RAM)) 1514 and/or nonvolatile memory (e.g., read-only memory (ROM) 1516). Memory device(s) 1504 may also include rewritable ROM, such as Flash memory.

Mass storage device(s) 1508 include various computer readable media, such as magnetic tapes, magnetic disks, optical disks, solid state memory (e.g., Flash memory), and so forth. As shown in FIG. 15, a particular mass storage device is a hard disk drive 1524. Various drives may also be included in mass storage device(s) 1508 to enable reading from and/or writing to the various computer readable media. Mass storage device(s) 1508 include removable storage 1526 and/or non-removable media.

I/O device(s) 1510 include various devices that allow data and/or other information to be input to or retrieved from computing device 1500. Example I/O device(s) 1510 include cursor control devices, keyboards, keypads, microphones, monitors or other display devices, speakers, printers, network interface cards, modems, lenses, CCDs or other image capture devices, and the like.

Display device 1528 includes any type of device capable of displaying information to one or more users of computing device 1500. Examples of display device 1528 include a monitor, display terminal, video projection device, and the like.

Interface(s) 1506 include various interfaces that allow computing device 1500 to interact with other systems, devices, or computing environments. Example interface(s) 1506 include any number of different network interfaces 1520, such as interfaces to local area networks (LANs), wide area networks (WANs), wireless networks, and the Internet. Other interfaces include user interface 1518 and peripheral device interface 1522.

Bus 1512 allows processor(s) 1502, memory device(s) 1504, interface(s) 1506, mass storage device(s) 1508, and I/O device(s) 1510 to communicate with one another, as well as other devices or components coupled to bus 1512. Bus 1512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1500, and are executed by processor(s) 1502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

CONCLUSION

Although the systems and methods for monitoring and reporting usage of a mobile device have been described in language specific to structural features and/or methodological operations or actions, it is understood that the implementations defined in the appended claims are not necessarily limited to the specific features or actions described. Rather, the specific features and operations of mobile device monitoring and usage reporting are disclosed as exemplary forms of implementing the claimed subject matter.

The invention claimed is:

1. A method implemented on a mobile device, the method comprising:
    receiving video content from a data source;
    playing the received video content to a user of the mobile device;
    detecting an interruption of playing the received video content;
    determining an event associated with the interruption;
    storing the event associated with the interruption, including a reason for the interruption, in a file in the mobile device; and
    communicating the file including the event associated with the interruption to a remote device based upon a determined amount of data within the file.

2. A method as recited in claim 1 wherein the remote device is a server configured to store data associated with operation of the mobile device.

3. A method as recited in claim 1 wherein determining an event associated with the interruption includes determining whether the user selected different video content for viewing.

4. A method as recited in claim 1 wherein determining an event associated with the interruption includes determining whether the mobile device was powered off.

5. A method as recited in claim 1 wherein determining an event associated with the interruption includes determining whether the mobile device status was changed to standby.

6. A method as recited in claim 1 wherein determining an event associated with the interruption includes determining whether the user activated a different application on the mobile device.

7. A method as recited in claim 1 wherein determining an event associated with the interruption includes determining whether the user activated a telephone service on the mobile device.

8. A method as recited in claim 1 wherein determining an event associated with the interruption includes determining whether the mobile device lost communication with the data source.

9. A method as recited in claim 1 wherein determining an event associated with the interruption includes determining whether the user explicitly interrupted the playing of the received video content on the mobile device.

10. A method as recited in claim 1 wherein storing the event associated with the interruption in the mobile device includes storing information associated with the event in a log file contained in the mobile device.

11. A method as recited in claim 1 wherein communicating the event associated with the interruption to a remote device includes communicating information stored in a log file in the mobile device to the server via a wireless communication link.

12. A method comprising:
    receiving video content from a data source;

communicating the received video content to a portable computing device, wherein the portable computing device plays the video content;

detecting an event associated with an interruption of the playing of the received video content on the portable computing device;

storing the event, including a reason for the interruption, in a log file; and communicating the event to a remote device when it is determined that the file has a particular number of entries or that the file has a particular percentage of used storage space.

13. A method as recited in claim 12 wherein the event includes an action initiated by a user of the portable computing device.

14. A method as recited in claim 12 wherein the event includes a change in the power status of the portable computing device.

15. A method as recited in claim 12 wherein the event includes a loss of communication with the data source.

16. A method as recited in claim 12 wherein the event includes activating a different application on the portable computing device.

17. A mobile device comprising:
a processor;
a memory coupled to the processor, the memory comprising processor-executable instructions that, when executed by the processor, perform operations including:
receiving video content from a data source;
rendering the received video content for display on the mobile device;
displaying the rendered video content on the mobile device;
detecting interruption of displaying the rendered video content on the mobile device;
determining an event associated with the interruption;
storing data associated with the event in a file in the mobile device; and
communicating the file including stored event data to a remote device based upon a determined amount of data within the file; and
a GPS module coupled to the processor and configured to identify location information associated with the mobile device in response to detecting the interruption.

18. A mobile device as recited in claim 17 further comprising a communication module coupled to the processor and configured to communicate with the remote device.

19. A mobile device as recited in claim 17 further comprising a data storage device coupled to the processor and configured to store data associated with a plurality of events.

20. A method as recited in claim 1 wherein the reason is selected from a group consisting of:
a user channel change command;
a change in power state;
an activation of a different application;
a loss of communication signal; and
a user stop command.

21. A method as recited in claim 1 wherein the file is communicated to the remote device when it is determined that the file has a particular number of entries.

22. A method as recited in claim 1 wherein the file is communicated to the remote device when it is determined that the file has a particular percentage of used storage space.

* * * * *